No. 752,422. PATENTED FEB. 16, 1904.
J. W. SCHUCKERS.
TYPE WRITING MACHINE.
APPLICATION FILED MAR. 9, 1901.
NO MODEL. 6 SHEETS—SHEET 4.
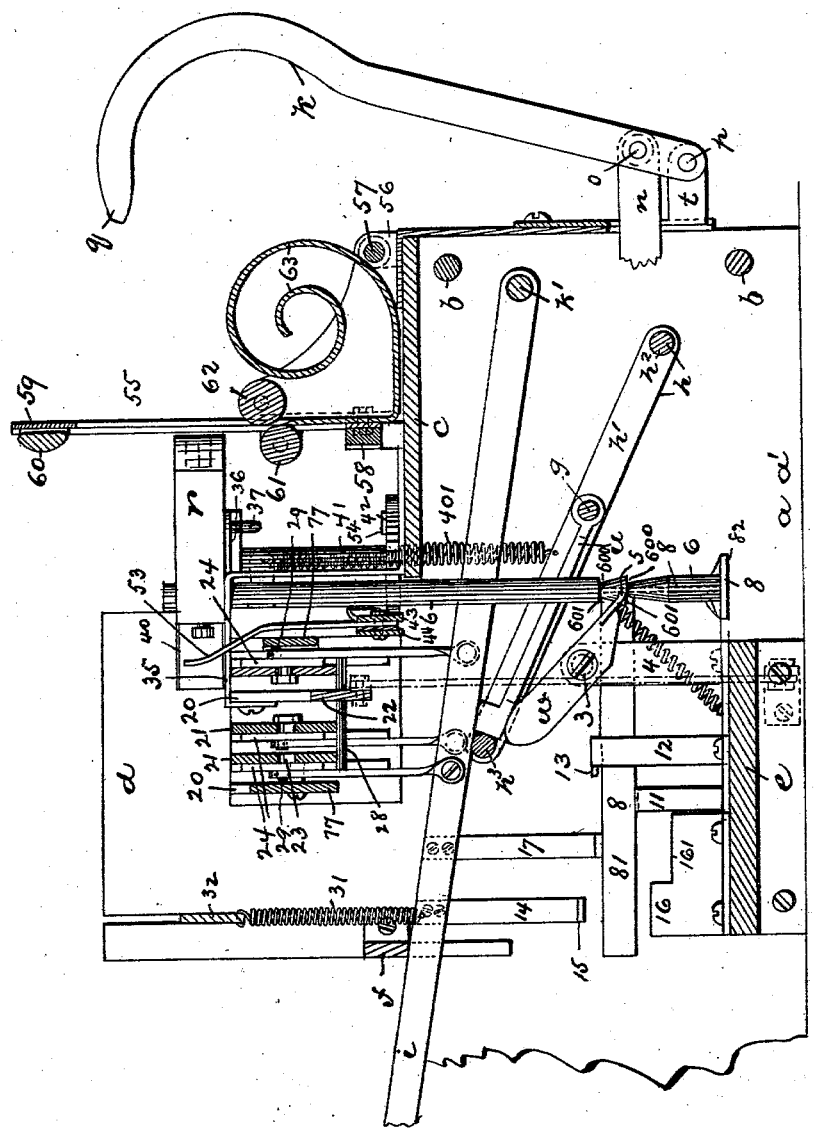
WITNESSES:
Henry Krug
Russell M. Everett
INVENTOR
Jacobs W. Schuckers,
BY
Drake Co.
ATTORNEYS.

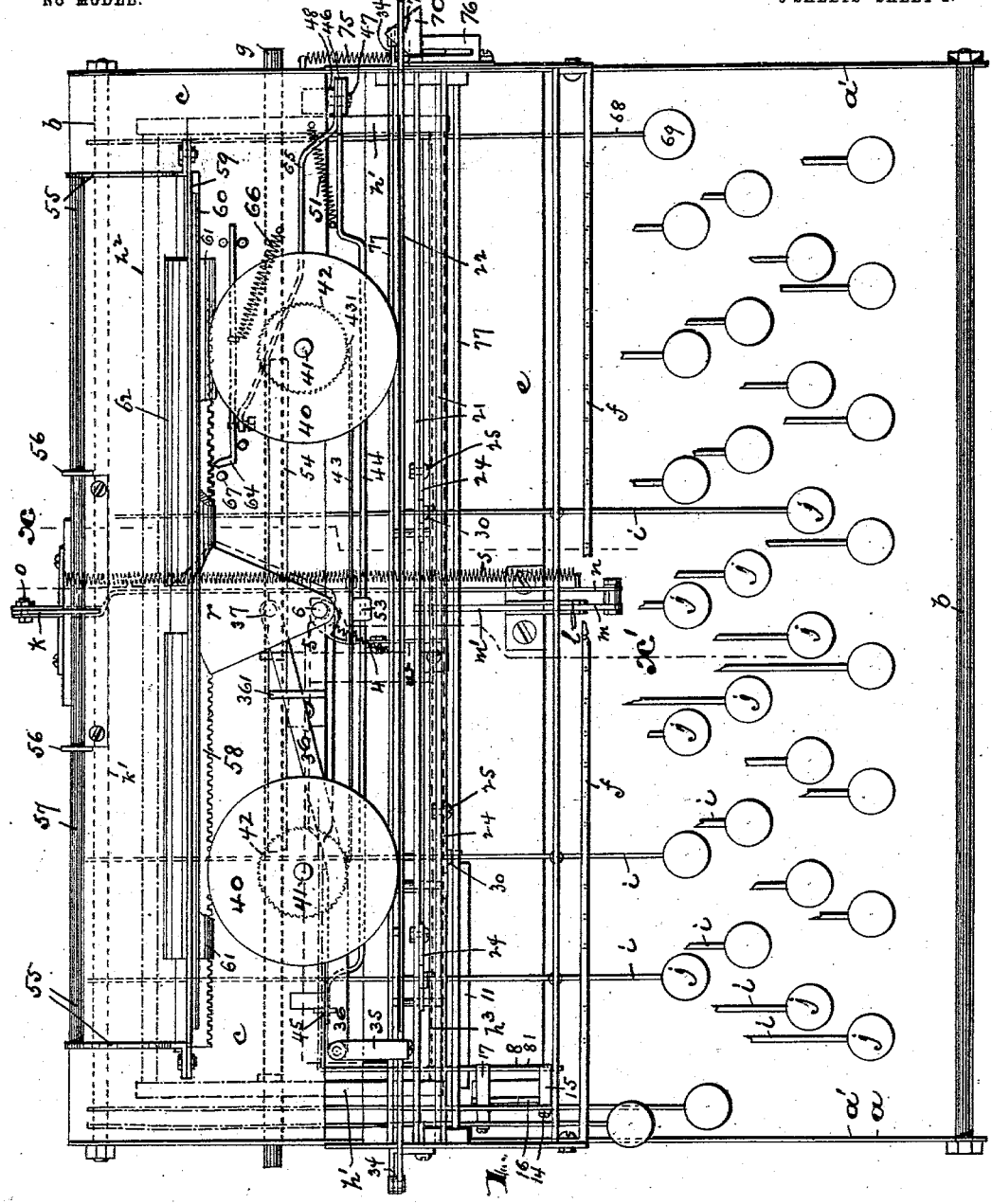

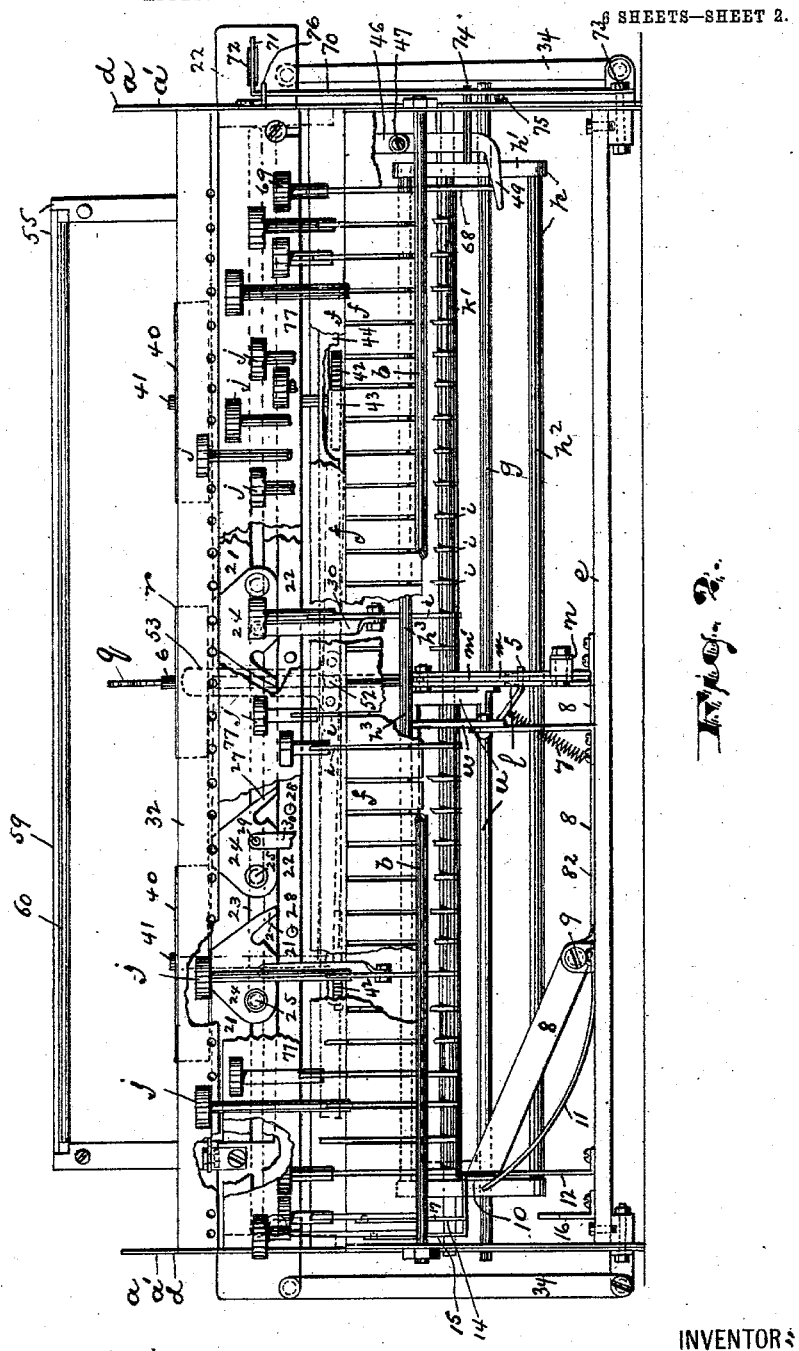

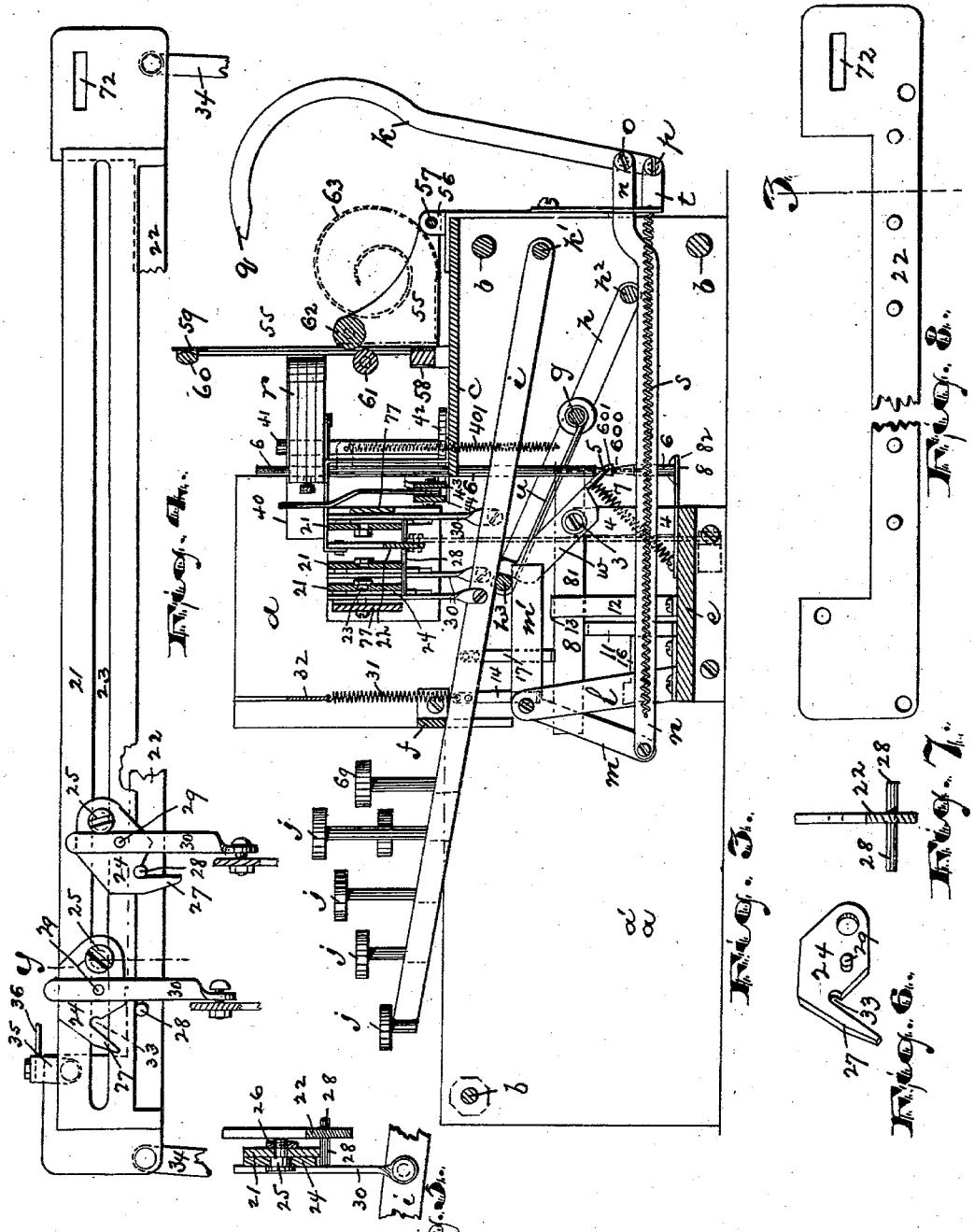

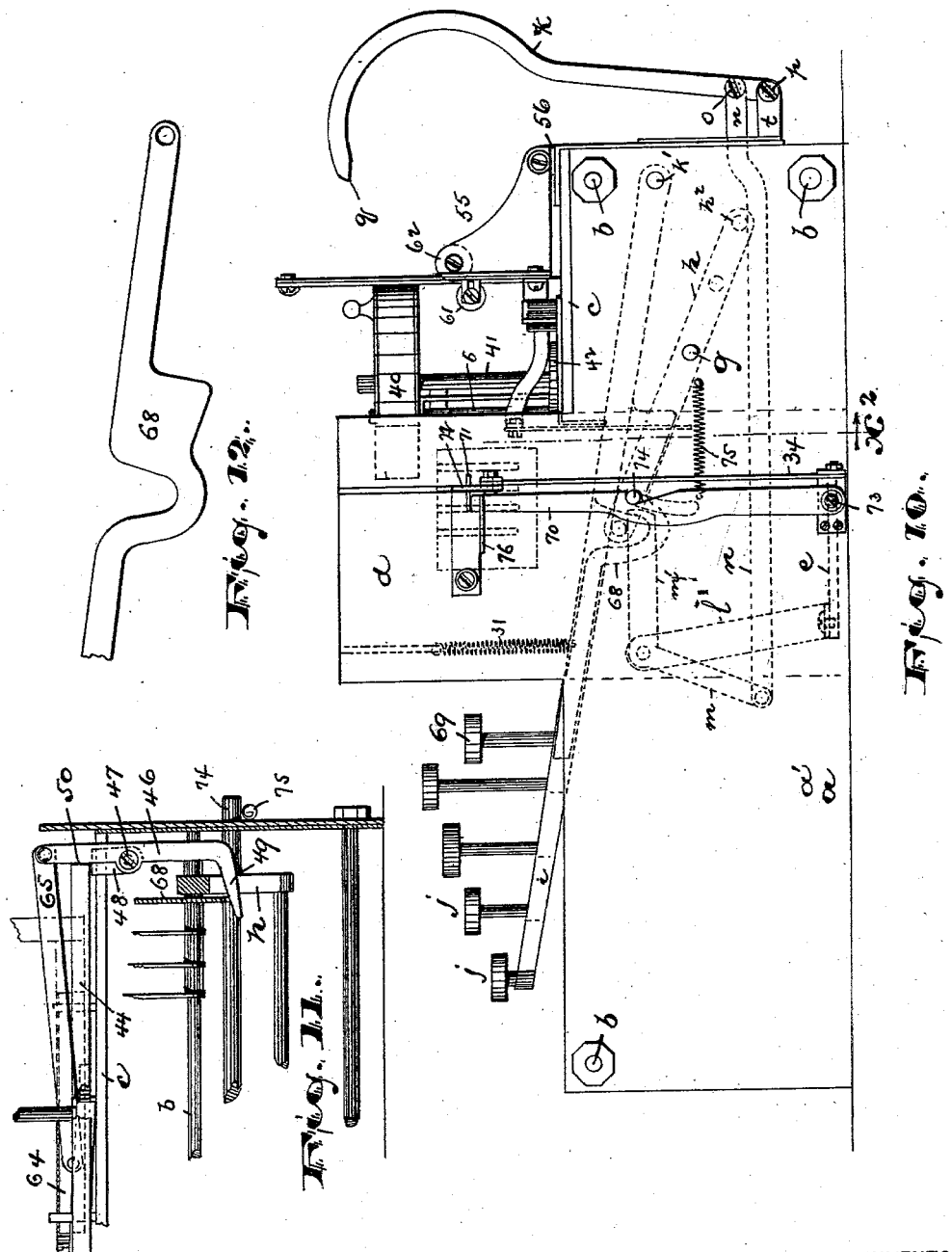

No. 752,422. PATENTED FEB. 16, 1904.
J. W. SCHUCKERS.
TYPE WRITING MACHINE.
APPLICATION FILED MAR. 9, 1901.
NO MODEL. 6 SHEETS—SHEET 6.
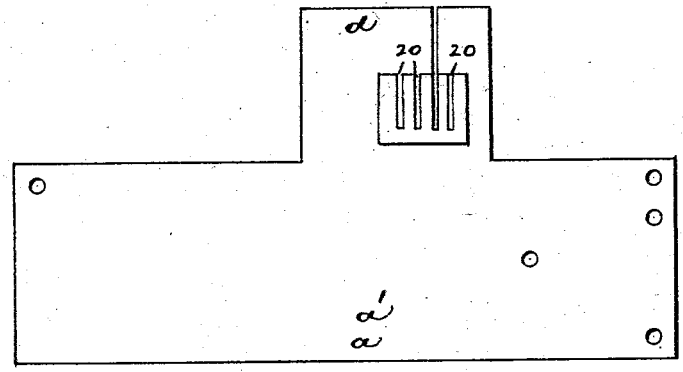
Fig. 13.
Fig. 14.
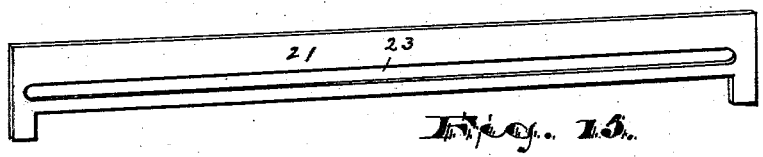
Fig. 15.
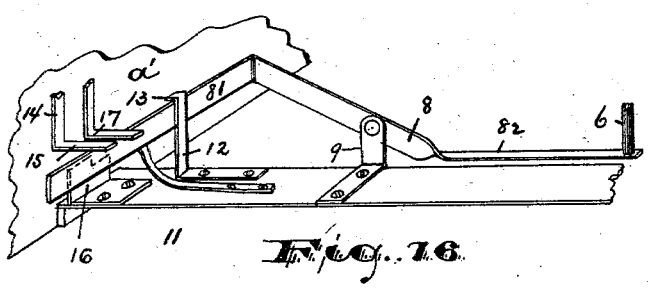
Fig. 16.
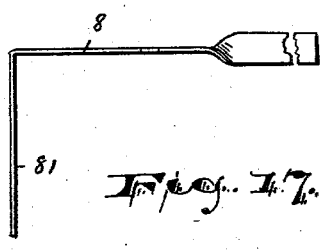
Fig. 17.
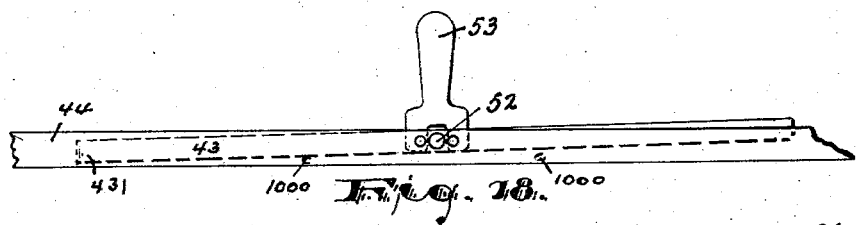
Fig. 18.
Fig. 19.
WITNESSES: INVENTOR:
Henry Krug Jacob W. Schuckers,
Russell M. Everitt. BY
Drake & Co.
ATTORNEYS.

No. 752,422. Patented February 16, 1904.

UNITED STATES PATENT OFFICE.

JACOBS W. SCHUCKERS, OF NEWARK, NEW JERSEY.

TYPE-WRITING MACHINE.

SPECIFICATION forming part of Letters Patent No. 752,422, dated February 16, 1904.

Application filed March 9, 1901. Serial No. 50,469. (No model.)

*To all whom it may concern:*

Be it known that I, JACOBS W. SCHUCKERS, a citizen of the United States, residing at Newark, in the county of Essex and State of New Jersey, have invented certain new and useful Improvements in Type-Writing Machines; and I do hereby declare the following to be a full, clear, and exact description of the invention, such as will enable others skilled in the art to which it appertains to make and use the same, reference being had to the accompanying drawings, and to the characters of reference marked thereon, which form a part of this specification.

The objects of this invention are to secure a type-writing machine capable of performing its work satisfactorily to those skilled or unskilled in the art of type-writing and yet one which will be of small cost of construction as compared with the high-class type-writing machines now on the market, to secure a high rate of speed and greater durability, to obtain a device of more simple construction and one that can be easily and quickly repaired and adjusted by one of ordinary mechanical skill, and to secure other advantages and results, some of which may be referred to hereinafter in connection with the description of the working parts.

The invention consists in the improved type-writing machine and in the arrangements and combinations of parts of the same, all substantially as will be hereinafter set forth, and finally embraced in the clauses of the claim.

Referring to the accompanying drawings, in which like characters of reference indicate corresponding parts in each of the several figures, Figure 1 is a plan of my improved type-writing machine, certain duplicates of the parts which are desirable to secure a perfect working of the machine being omitted for the sake of clearness of illustration. Fig. 2 is a front elevation of the same. Fig. 3 is a transverse section taken on line $x$ of Fig. 1. Fig. 4 is a detail front elevation of a reciprocating plate, a deflector-supporting bar, and connections, showing the relations of parts of the same, as will be hereinafter more fully described. Fig. 5 is a section of the same, taken at line $y$. Fig. 6 is a perspective view of a deflector. Fig. 7 is a section taken at line $z$ of Fig. 8, and Fig. 8 is a detail elevation of the reciprocating plate before referred to. Fig. 9 is a sectional view similar to section 4, on an enlarged scale, certain of the parts being omitted to show other parts more clearly, the section-line being taken at line $x'$ of Fig. 1. Fig. 10 is an end view of the machine. Fig. 11 is a detail section taken at line $x^2$ of Fig. 10. Fig. 12 is a detail view showing a portion of the spacing-key. Fig. 13 is an inside view of one of the side plates of the frame. Fig. 14 is an edge view of the same. Fig. 15 is a perspective view of the deflector-supporting bar in detail. Fig. 16 is a perspective detail showing more clearly the construction and arrangement of a certain type-wheel-elevating lever. Fig. 17 is a plan of said lever. Fig. 18 is a detail elevation of a certain double pawl and its carrier, and Fig. 19 is a plan of the same.

In carrying out the invention I provide a suitable base-plate or frame $a$, of any suitable construction, which in the construction hereinafter more particularly described comprises side plates $a'$, joined together at suitable points by longitudinal bolting-rods $b$ and at the rear of the machine by a table-plate $c$, the said table-plate being arranged a little above the rear ends of the finger-key levers and below the level of the reciprocating bar and deflector-plate hereinafter referred to. At a point about midway of the front and rear of the machine the said frame $a$, or the side plates $a'$ thereof, is provided with standards $d$, which are preferably integral with the side plates and extend upward above the level of the table-plate $c$ to provide bearings for the reciprocating bar and other working parts hereinafter referred to. At the bottom of said frame $a$, extending from side to side of the machine, at a point midway between the front and rear of said machine, the said frame is furthermore provided with a bottom plate $e$, upon which certain of the operating parts have their bearings and supports.

The parts above referred to may be in separate parts or may be integrally connected, as convenience may dictate.

At the front of the standard $d$ and extending from side to side of the frame is secured a toothed guide-bar $f$ for the finger-key levers, the teeth of said bar preventing lateral movement of said finger-key levers. The said guide-bar resembles a comb in that it has a series of vertical slots in which the finger-key bars move vertically when depressed by the fingers.

Arranged upon a fulcrumal bar $g$, extending from side to side of the machine at a point beneath the table-plate $c$, is arranged the universal lever-frame $h$, comprising side pieces $h'$ and longitudinal connecting-rods $h^2 h^3$, and said universal lever-frame $h$ at its front $h^3$ is engaged by the series of finger-key levers $i$, having the finger-keys $j$ at their foot extremities, the said levers being fulcrumed at the back of the machine upon the fulcrumal bar $k'$. Said fulcrumal lever-frame $h$ is held in normal position by a spring 401.

The construction and arrangement of the universal lever-frame $h$ may be of any construction and arrangement commonly found in type-writing machines.

By means of the universal frame $h$, finger-key levers $i$, and connecting parts the printing-hammer $k$ is uniformly operated to effect a printing or impression. To secure such an operation of the said hammer by means of a simple and inexpensive construction and one which will be durable in operation and easily repaired should the parts become disorganized or out of proper operative relation, I have provided the construction shown more clearly in Fig. 3, where I have arranged a stud $l$ upon the supporting-plate $e$, which serves as a fulcrumal bearing for a bell-crank lever $m$, one arm of which latter, (marked $m'$,) extends beneath the bar $h^3$ of the universal-frame lever $h$, and the other arm of which extends downward into pivotal connection with a connecting-rod $n$, which extends in turn rearward into pivotal connection with the lever-like hammer $k$, the pivotal connection $o$ of said rod $n$ with the said hammer $k$ being near the fulcrum $p$ of said hammer intermediate of said fulcrum and the free extremity $q$ of said hammer, and thus when one of the finger-key levers $i$ is pressed down by the finger upon the bar $h^3$ the said bar $h^3$ will press upon the arm $m'$ and cause the lever $m$ to turn on its fulcrum and draw the connecting-rod forward, and with it the free end of the hammer, causing the said free end of the hammer to effect a blow upon the type-wheel $r$ or upon the ribbon or paper interposed between said hammer and said wheel.

To hold the hammer $k$ at its free end normally away from the type-wheel, I have provided a retracting-spring $s$, Fig. 3, which is normally under tension and attached to the connecting-rod $n$ at one end and at its opposite end to a suitable fixture, such as a fulcrumal bracket $t$, upon which the hammer is pivotally secured.

Upon the same fulcrumal shaft $g$ upon which the universal frame $h$ is pivoted is also fulcrumed a type-wheel-elevating-lever frame $u$, which is preferably also of a frame-like form and extends about half-way, more or less, of the distance between the side or end plates of the main frame and is operated upon by about one-half of the finger-key levers. The said frame $u$ is depressed with the frame-lever $h$ by the finger-key levers $i$, by which it is engaged and in turn engages a lever $w$, fulcrumed at 3 upon a stud 4, secured upon the plate $e$. The said lever $w$ is bifurcated at its lower extremity and straddles a vertical type-wheel shaft 6, which said shaft adjacent to said bifurcated lever is provided with peripheral grooves or notches 600, in which the prongs 5 of the bifurcated lever lie when in operative engagement. The said prongs 5 when the lever $w$ is pressed down, as above indicated, bear upward against one of a plurality of shoulders 601, formed on said shaft 6, and thus raises said shaft, and with it the type-wheel $r$, so that a lower series of lower-case letters are raised to a proper plane of engagement with the hammer $k$. A spring 7 serves to draw the bifurcated arm of the lever away from engagement with the shaft 6, so that the latter, with its wheel, may fall by gravity to bring the said wheel once more into normal relation with an upper series of lower-case letters on said wheel. Said spring also operates to return the frame-lever $u$ to its normal position.

To bring the capital letters, which occupy the third and fourth rows or spaces of the type-wheel, from the top into operative relation with the hammer, I have provided in connection with the lower series another type-wheel-elevating lever 8, which is fulcrumed at 9 (shown in detail in Figs. 16 and 17) and bent to form an arm 81, which extends parallel with the sides of the frame. Said arm 81 is engaged by a spring 11 to hold the same normally free from engagement with the type-wheel shaft. Adjacent to the said bent end of the lever 8 I have provided a standard 12, having at its upper extremity a hook or stay projection 13, which extends over the arm of the lever and limits its upward movement to hold said lever 8 in position.

Upon one of the finger-key levers $i$ is fastened a leg 14, having at its lower end a foot 15, Figs. 9 and 16, adapted to press upon the arm 81 of the lever 8 and lower said arm when the finger-key is lowered. Said foot 15 at its lowest limit of movement impinges upon a stop-piece 16, and is thereby limited in its movement.

The lowering of the arm of the lever 8, as above described, causes an elevation of the opposite arm 82 of said lever, and with it an endwise elevation of the shaft 6, a distance sufficient to bring the first series of capitals upon the type-wheel into operative relation. To bring a second series of said capitals into play, the shaft 6, provided with a second lower peripheral notch and shoulder, is raised by the lever 8, so that the bifurcated lever $w$ will enter the said second lower notch, and thus the said shaft 6 may be further elevated by the universal lever $h$, above referred to.

Should I employ other series of letters or symbols or punctuation-marks, &c., I may upon a suitable finger-key arrange another leg 17 to engage the arm 81 of the lever 8 to still further depress the arm 81 and elevate the opposite arm, and with it the shaft 6, the stop-piece 16 being provided with a lower step 161 to limit the movement. This arrangement may be repeated in accordance with the number of series of letters, numbers, and punctuation-marks, &c., employed upon the periphery of the wheel.

At the upper end of the shaft 6 is arranged the type-wheel $r$, which may be a circular wheel, but is preferably the segment of a circle, and the shaft 6 is preferably an oscillating shaft and is caused to oscillate to a greater or less degree or move in a longer or shorter segment of a circle by means of the finger-key levers working in connection with a series of deflectors 24, hereinafter more fully described, the said deflectors forming important features of novelty in this invention.

Arranged upon the frame $a$, which at its opposite sides is provided with suitable bearings therefor, which bearings may be in slots 20, Figs. 9 and 13, open at the top to permit an easy insertion and removal, are the deflector-supporting plates 21 21, reciprocating bar 22, and other parts hereinafter mentioned. The said deflector-supporting plates 21 are preferably slotted longitudinally, as at 23, (shown clearly in detail in Figs. 4 and 15,) and each provides a seat on which a series of deflectors 24 are adjustably secured. Said deflectors 24 (shown in detail in Figs. 4 and 6) are each pivoted upon a screw 25, (shown in Fig. 5,) where the said screw is shouldered to provide a free pivot for the deflectors 24 and permit of being firmly and rigidly clamped by means of a nut 26 to the deflector-plate. At the free ends of said deflectors 24, opposite where they are perforated to receive the pivotal screws 25, said deflectors 24 are provided with deflecting-fingers 27, which are formed tangentially upon said deflectors, so as to engage pins or projections 28 of the coöperating reciprocating bar 22 and effect longitudinal movement of said reciprocating bar 22 of a greater or less extent, the length of movement of said bar being increased or diminished in accordance with the adjustment of the deflector upon the deflector-supporting plate or with the location of the pin 28 with which the finger 27 engages or of the adjustment of both said deflector and pin. The adjustable arrangement of the deflectors permits a quick and convenient correction of error in the movement of the type-wheel, as will be hereinafter more fully described.

Between the pivotal screws 25 and the deflecting-fingers 27 the deflectors are provided each with a pin 29, by which a connecting-rod 30 is pivotally connected to its finger-key lever $i$, so that when said finger-key lever $i$ is depressed the said connecting-rod 30 will turn its deflector pivotally downward, and so that the deflecting-finger 27 will engage one of the pins 28 of the reciprocating bar and cause said bar to slide longitudinally in its bearings and effect an oscillation of the type-wheel a given or predetermined degree.

The deflectors are each returned to their normally disengaged position by a spring 31, connecting the finger-key with a spring-supporting plate or bar 32, extending from one side plate $d$ to the other.

The deflectors 24 at the base of the deflecting-fingers 27 are each provided with a notch 33 to receive the pin 28, with which said deflector engages, and when the pin 28 enters the said notch further movement of the deflector and coöperating parts is prevented, said parts being then positively and rigidly locked, and the type-wheel particularly being locked and held rigidly in place, so that a positive and clear impression of the type will be made by the hammer on the paper.

The reciprocating bar 22, having the pins 28 extend laterally therefrom to engage the deflectors, is preferably supported at opposite ends by oscillating rods 34, so that but little power is required to move said bar 22 longitudinally. Said bar 22 near one end is provided with an arm 35, which extends rearward into pivotal connection with a rod 36, which loosely connects with the type-wheel $r$ or with a pin 37 on the said type-wheel lying eccentric to the type-wheel shaft 6, the type-wheel $r$ thus being oscillated on its said shaft as the said arm 35 and reciprocating bar 22 are moved by the deflectors. Thus the said wheel $r$ is moved in one direction or the other a greater or less degree from a normal position by the deflectors, the degree of movement being regulated and controlled by the position and relation of the deflectors and their connections. A slotted guide 361 serves to hold the rod 36 in horizontal position and so that the type-wheel may work vertically without moving the connecting-rod with it, thus conducing to an easy vertical movement of the type-wheel.

The reciprocating bar 22 is returned to a normally central position with the face of the type-wheel by means of a centering-piece 70, having a wedge-shaped jaw 71, adapted to enter a slot 72, formed in one of the projecting ends of the reciprocating bar, as shown in Figs. 1 and 2. Said centering piece 70 is preferably a lever fulcrumed at the outside of one of the side plates of the frame, preferably at the bottom thereof, as at 73, Fig. 2, and intermediate of the fulcrum and jaw 71 said lever-like centering piece is engaged by a pin or projecting bearing 74, extending through a suitable slot or opening in the side plate from the universal frame, so that as said universal frame is turned by the finger-key levers the centering-piece jaw will be withdrawn from the slot to permit a lengthwise movement of the reciprocating bar; but when said finger-piece lever and universal frame are allowed return movements then a spring 75 operates to force the wedge-shaped jaw, small end foremost, into the slot 72, one or the other of the inclined sides of the said centering-piece jaw engaging an end wall of the slot to bring the reciprocating bar 22 back to a desired normal position with a resilient pressure.

To hold the centering piece in operative relation, I may employ a slotted bracket 76 as a guide and stay, as indicated more clearly in Figs. 1 and 2.

In connection with the deflector-plates 21 and deflectors 24, separably carried thereby, I prefer to employ separable retaining-plates 77 for the outer deflector-plates of the series, which retaining-plates 77 bear against or lie near to the ends of the pins 29, so that the deflectors 24 and the links or connecting-rods 30 are held in operative relation.

By simply removing the retaining-plates 77 the parts held in place thereby may be removed to permit of adjustment, repair, &c.

The forward deflector-plate 21 also serves as a retaining-plate for the next series of deflectors in order toward the rear.

In connection with the type-wheel r I employ means for transferring a ribbon from one drum or spool 40 to the other, the ribbon in its passage extending across the face of the type-wheel, so that when the hammer strikes upon the paper and drives said paper against the ribbon and wheel an impression of the type will be made upon the said paper. A rubber band may be interposed between the paper and the hammer. The spools 40 are so constructed and operated that after one spool is fully unwound the movements of the spools may be reversed, so that the empty spool may be rewound during the type-writing operation, and thus again charged with ribbon, and the full spool again unwound, and thus the spools may be alternately wound and unwound without removal from their shafts 41. To effect this result with ease and simplicity of construction, I have arranged upon the spool-shafts 41 ratchet-wheels 42, which latter are engaged by a double pawl 43, arranged upon a sliding carrier 44. Said pawl-carrier is suitably held in slideways 45 45, upon the table plate c of the bed-frame and is given a longitudinal movement in one direction in said slideways by a driving-lever 46, which is fulcrumed, as at 47, upon a suitable bracket or fixture 48 of the frame and is in turn driven by the universal frame, which engages the inclined arm 49 of said lever 46, so as to oscillate said lever when the frame h is operated by the finger-key bars. Said lever 46 bears, as at 50, Fig. 11, upon the end of the pawl-carrier 44 and drives said carrier longitudinally against the power of a spring 51, Fig. 1. Upon a release of the finger-key the said spring 51 returns the pawl-carrier to its normal position.

At about the center of the pawl-carrier 44, at a point about midway between the ratchet-wheels 42 42, the said carrier provides a fulcrumal bearing 52 for the double pawl, said double pawl oscillating on said bearing 52, so that when one pawl extremity is in engagement with its ratchet-wheel the other pawl extremity will be out of such engagement. To oscillate the double pawl on said fulcrumal bearing, I have provided a finger-piece 53, which extends up to a position easy of manipulation and at its lower end is bifurcated to straddle the pivot or fulcrumal pin 52, on which the double pawl is adapted to oscillate, the prongs of the finger-piece being riveted or otherwise attached to the body of the pawl at opposite sides of said fulcrum. At opposite ends of the pawl-body the pawl is formed to push on one ratchet-wheel, and at the opposite end it is hooked, as at 431 in Fig. 19, to pull on the other ratchet-wheel. To move the ribbon from spool to spool, one pawl end is raised from its contiguous ratchet-wheel, so that as the carrier 44 is moved reciprocally by the means already described the other pawl end will engage the other ratchet-wheel and rotate the same by a step-by-step or intermitting movement. By turning the finger-piece and reversing the pawls in their relations to the ratchet-wheels the opposite ratchet-wheel to that first operated will be driven and the ribbon will be reversed in direction of movement, as will be understood. Stop-pins 1000 may be employed to limit the movement of the pawl, as indicated in Figs. 18 and 19.

To prevent undue movement of the ratchet-wheels, friction-springs 54 may be employed to bear on said wheels and prevent such undue movement by frictional contact.

Upon the table c I provide a sliding paper-carrying frame 55, arranged in slideways or brackets 56, the said frame 55 having a shaft 57, which is arranged in said brackets 56 and move not only lengthwise of said shaft, but also pivotally a limited distance to permit a better view of the paper when on said frame. At the bottom of said frame, forward of the shaft 57, is secured a rack 58, having its teeth face toward the front of the machine, and above the rack are supports for the paper, which may be rods 59 60 and rollers 61 62, adapted to hold the paper normally in a vertical position nearly in engagement with the face of the type-wheel, there being a space between for the passage of the ribbon. Thus when the paper is in place and the finger-keys are operated the hammer will strike behind the paper and drive it and the ribbon against the type, and thus secure an impression of the type upon the front of the paper. A rolling device 63, Fig. 9, for the paper is also arranged upon the frame, so as to roll the paper after it has been printed.

The frame 55 is moved laterally on its slideways by means of a pawl 64, loosely arranged upon the table-plate c adjacent to the rack 58 and adapted to move at its toothed end to and from the said rack and loosely connected by means of a connecting-rod 65 to the lever 46, so as to cause said pawl 64 to move reciprocally to and from engagement with the rack and move the said rack longitudinally the distance of a tooth, the spacing of the teeth of the rack and of the pawl agreeing with the spacing of the letters on the type-wheel. A spring 66 gives return movement to the pawl 64, and the movement of the said pawl to effect a forward movement of the rack is limited by a stop 67.

The lever 46 is not only operated by the universal frame $h$, but also by a spacing-lever 68, Fig. 12, having a finger-key 69, Fig. 3, and adapted to be moved without moving the universal lever-frame $h$, so that the lever 46 and its connections with the paper-feed rack may be independently operated without operating the hammer.

I am aware that various and numerous variations and modifications of the particular construction shown may be employed without departing from the spirit and scope of this invention, and I do not wish to be understood as limiting myself by the positive terms employed in describing the specific construction shown, excepting as the prior state of the art may require.

Having thus described the invention, what I claim as new is—

1. In a type-writing machine, the combination with a type-wheel and a reciprocating bar in connection therewith, of a deflector having a tangential finger adapted to operate said bar when said deflector is turned pivotally and a finger-key connected with said deflector, substantially as set forth.

2. In a type-writing machine, the combination with a type-wheel and a reciprocating bar connected with said type-wheel and having a series of pins or projections, of a deflector-supporting plate having a series of deflectors mounted thereon, each deflector being connected to a finger-key, and engaging said reciprocating bar, substantially as set forth.

3. In a type-writing machine, the combination with a type-wheel and hammer, of a reciprocating bar connected to said type-wheel and having engaging means for deflectors, a deflector-plate arranged parallel with said bar and having a series of deflectors pivoted thereon, and key-levers, each connected with one of said deflectors and adapted to turn said deflectors and effect a movement of the reciprocating bar and type-wheel, substantially as set forth.

4. In a type-writing machine, the combination with a type-wheel and hammer, of a reciprocating bar connected to said type-wheel and having abutments to be engaged by the deflectors, a deflector-plate having a series of adjustable deflectors mounted thereon and key-levers for operating said deflectors, substantially as set forth.

5. In a type-writing machine, the combination with a type-wheel, of a carrying-plate, a series of deflectors adjustably mounted upon said carrying-plate, a bar connected to the type-wheel, and adapted to be engaged by said deflectors to effect differential movements of said type-wheel and a series of key-levers connected to said deflectors, substantially as set forth.

6. In a type-writing machine, the combination with a type-wheel, of a carrying-plate, a series of deflectors adjustably mounted upon said carrying-plate, a bar connected to the type-wheel and adapted to be engaged by said deflectors, some of the deflectors moving said bar from a normal center in one direction and others of said deflectors moving said bar in the opposite direction, and means for returning said bar to the normal central position and keys for operating the deflectors, substantially as set forth.

7. In a type-writing machine, the combination with the type-wheel and finger-keys, of connecting means including carrying-plates, and a series of deflectors mounted on said plates, some of which deflectors move the type-wheel in one direction and others of which move the type-wheel in the opposite direction from a normal position, and means for returning said type-wheel to a normal central position, substantially as set forth.

8. In a type-writing machine, the combination with the type-wheel and finger-keys, of connecting means including a series of tangential deflectors and a reciprocating bar having projections engaged by the tangential parts of said deflectors, and a wedge-shaped device for returning said bar and with it the type-wheel to a normal position, substantially as set forth.

9. In a type-writing machine, the combination with the type-wheel and finger-keys, of connecting means including a series of pivotal deflectors each having a tangential finger at a distance from its pivot, and another pivot intermediate of said finger and pivot to receive pivotally other parts of the said connecting means, substantially as set forth.

10. In a type-writing machine, the combination with the type-wheel and finger-keys, of connecting means including a series of pivotal deflectors, each deflector being provided with a deflecting-finger and at the base of said finger having a locking-notch to receive a pin or projection of the coöperating connections, substantially as set forth.

11. In a type-writing machine, the combination with the type-wheel and finger-keys, of connecting means including a reciprocating bar having a series of pins or projections, a plate having a series of deflectors having tangential fingers, said deflectors being each connected to its individual finger-key by means of a connecting-rod, substantially as set forth.

12. In a type-writing machine, the combination with the oscillating type-wheel and finger-keys, of intermediate connections including a series of deflectors mounted adjustably on a common carrier and connected, each to its individual finger-key by a connecting-rod and means for clamping and securing said deflectors in operative position upon said carrier when adjusted thereon, substantially as set forth.

13. In a type-writing machine, the combination with the oscillating type-wheel, reciprocating bar having a series of pins, and means for transmitting motion from said bar to said wheel, of a deflector-carrying plate having a series of deflectors pivoted thereon, a series of finger-keys and connecting-rods pivoted upon said deflectors and keys, substantially as set forth.

14. In a type-writing machine, the combination with the type-wheel and finger-key levers, of connections of said parts including pivotal deflectors having tangential fingers and between said fingers and the pivots of said deflectors having a pivotal connection with rods connecting with the finger-key levers, substantially as set forth.

15. In a type-writing machine, the combination with the type-wheel and finger-key levers, of connections of said parts, including a reciprocating bar supported at opposite ends on oscillating rods 34, and having pins or projections extending perpendicular thereto, and a plate having a series of pivotal deflectors, having tangential fingers to engage said pins or projections and move said reciprocating bar and the type-wheel, substantially as set forth.

16. In a type-writing machine, the combination with the type-wheel and finger-key levers, of connections of said parts including a reciprocating bar, supported at opposite ends on oscillating rods arranged at the opposite sides or ends of the machine, said reciprocating bar having studs or pins extending perpendicular thereto, and being engaged by deflectors stationed in a series adjacent to said pins or projections, said deflectors being operated individually by the said key-levers, substantially as set forth.

17. In a type-writing machine, the combination with the slotted frame, type-wheel and finger-key levers, of connections of said levers and wheel, including a reciprocating bar arranged at its opposite ends in the slots of said frame and movable longitudinally therein, said reciprocating bar having studs or pins, and deflectors connected to the keys and operated individually, each by its key, to engage one of the pins or projections and give longitudinal movement to the reciprocating bar, substantially as set forth.

18. In a type-writing machine, the combination with the slotted frame and finger-key levers, of connections of said levers and wheel, including a reciprocating bar supported at opposite ends in suitable bearings and permitted a longitudinal movement therein, and a series of deflectors pivotally arranged adjacent to said reciprocating bar and adapted to impart each a different longitudinal movement to said bar, substantially as set forth.

19. In a type-writing machine with the bed-frame, a universal lever-frame and supplemental type-wheel-elevating lever pivoted on the fulcrum-shaft of the universal frame, a series of finger-key levers, a part of which engages the type-wheel-elevating lever, a lever engaged by said type-wheel-elevating lever and engaging the notched type-wheel shaft, said notched type-wheel shaft and its type-wheel, and a spring for holding the last said lever normally away from said type-wheel shaft and for causing the last said lever to hold the supplemental type-wheel-elevating lever in engagement with the key-levers, substantially as set forth.

20. In a type-writing machine, the combination with the bed-frame, a universal lever fulcrumed on said frame, a supplemental type-wheel-elevating lever, movable with said universal lever when the latter is depressed, a lever $w$, spring 7, notched type-wheel shaft, and its type-wheel and means for elevating said shaft to enable said lever $w$, to engage the shoulder of a lower notch in the said shaft, substantially as set forth.

21. In a type-writing machine, the combination with the bed-frame, of a series of deflector-plates arranged upon said bed-frame but removable therefrom, each plate being provided with a series of deflectors, each in operative connection with its key-lever, a series of key-levers, for operating said deflectors, a reciprocating plate operated by said deflectors and connected by a rod with the type-wheel, substantially as set forth.

22. In a type-writing machine, the combination with the bed-frame of the machine, of a series of deflector-plates fixed removably upon said bed-frame, each plate being provided with a series of deflectors, each in operative connection with its key-lever, a series of key-levers in connection with said deflectors, as described, a movable plate engaged by said deflectors and moved thereby, said plate being linked or connected to the type-wheel at its opposite ends being supported by pivoted rods, substantially as set forth.

23. In a type-writing machine, the combination with the bed-frame of the machine, of a series of deflector-plates fixed upon said bed-frame, each plate having a series of pivoted deflectors each pivotally connected with its key-lever, a series of key-levers in such connection with the deflectors, a movable plate having pins or projections engaged by the deflectors, said plate being slotted at one end to receive a centering-wedge and said wedge, substantially as set forth.

24. In a type-writing machine, the combination with the bed-frame, and universal frame having a centering-device-operating pin or projection, of a reciprocating bar having a series of pins or projections and having a connection with the type-wheel to oscillate the same said type-wheel, fixed deflector-plates each having a series of deflectors in connection with the keys, and said reciprocating bar having a slot at one end, and a centering device engaged by the pin of the universal frame and having a wedge to enter the slot of the reciprocating bar, substantially as set forth.

25. In a type-writing machine, the combination with the deflector-carrying plate, finger-key levers and deflectors connected with said levers and plate, of a reciprocating bar engaged by the deflectors, a wedge for centering said bar, a spring for effecting a centering movement of the wedge, and means for withdrawing the wedge from the reciprocating bar when the key-levers are depressed, substantially as set forth.

26. In a type-writing machine, the combination with the deflector-carrying plate, finger-key levers, and deflectors connected with said levers and plate, of a reciprocating bar engaged by the deflectors, and connected with the type-wheel to oscillate the same, and a lever 70, having at one end a wedge to engage the reciprocating bar and at the opposite end having a fulcrum, and intermediate of said wedge and fulcrum engaged by a universal lever to throw the wedge out of engagement with the reciprocating bar, and said universal lever operated by the finger-keys, substantially as set forth.

In testimony that I claim the foregoing I have hereunto set my hand this 26th day of February, 1901.

JACOBS W. SCHUCKERS.

Witnesses:
CHARLES H. PELL,
C. B. PITNEY.